United States Patent
Castiglione

(10) Patent No.: US 9,716,794 B1
(45) Date of Patent: *Jul. 25, 2017

(54) SYSTEMS AND METHODS FOR STATE INFORMATION EXCHANGE

(71) Applicant: UNITED SERVICES AUTOMOBILE ASSOCIATION (USAA), San Antonio, TX (US)

(72) Inventor: Anthony G. Castiglione, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/156,040

(22) Filed: May 16, 2016

Related U.S. Application Data

(63) Continuation of application No. 14/690,718, filed on Apr. 20, 2015, now Pat. No. 9,344,572, which is a continuation of application No. 11/759,139, filed on Jun. 6, 2007, now Pat. No. 9,014,365.

(51) Int. Cl.
| | |
|---|---|
| *H04M 3/00* | (2006.01) |
| *H04M 5/00* | (2006.01) |
| *H04M 3/51* | (2006.01) |
| *G06Q 30/02* | (2012.01) |
| *G10L 25/63* | (2013.01) |

(52) U.S. Cl.
CPC ...... *H04M 3/5191* (2013.01); *G06Q 30/0247* (2013.01); *G06Q 30/0255* (2013.01); *G06Q 30/0269* (2013.01); *G10L 25/63* (2013.01); *H04M 2201/405* (2013.01)

(58) Field of Classification Search
CPC ............ H04M 3/5191; G06Q 30/0244; G06Q 30/0255
See application file for complete search history.

(56) References Cited

U.S. PATENT DOCUMENTS

| | | |
|---|---|---|
| 6,163,794 A | 12/2000 | Lange et al. |
| 6,385,646 B1 | 5/2002 | Brown et al. |
| 6,385,651 B2 | 5/2002 | Dancs et al. |
| 6,389,132 B1 | 5/2002 | Price |
| 6,408,282 B1 | 6/2002 | Buist |
| 6,411,687 B1 | 6/2002 | Bohacek et al. |
| 6,614,783 B1 | 9/2003 | Sonesh et al. |
| 6,615,234 B1 | 9/2003 | Adamske et al. |
| 6,771,766 B1 | 8/2004 | Shafiee et al. |
| 6,831,966 B1 | 12/2004 | Tegan et al. |

(Continued)

OTHER PUBLICATIONS

United States Notice of Allowance issued in U.S. Appl. No. 14/690,718 dated Feb. 2, 2016.

(Continued)

*Primary Examiner* — Oleg Asanbayev
(74) *Attorney, Agent, or Firm* — Eric L. Sophir; Dentons US LLP

(57) ABSTRACT

Apparatus and method for sharing state information using a web-enabled system and a phone service system are disclosed. In some embodiments, a presence module is used to identify a currently accessed web page to an agent during an on-line session. In some embodiments, documents are delivered to a user through a web browser concurrent with an audio message delivered by phone. Concurrent delivery of documents configured to accept an electronic signature is disclosed.

20 Claims, 3 Drawing Sheets

(56) References Cited

U.S. PATENT DOCUMENTS

| | | |
|---|---|---|
| 6,947,531 B1 | 9/2005 | Lewis et al. |
| 6,965,870 B1 | 11/2005 | Petras et al. |
| 6,970,546 B2 | 11/2005 | Kent et al. |
| 7,020,690 B1 | 3/2006 | Haitsuka et al. |
| 7,127,495 B2 | 10/2006 | Brown et al. |
| 7,411,939 B1 | 8/2008 | Lamb et al. |
| 8,107,610 B2 | 1/2012 | Harris et al. |
| 2002/0021307 A1 | 2/2002 | Glenn et al. |
| 2002/0087882 A1 | 7/2002 | Schneier et al. |
| 2004/0193897 A1 | 9/2004 | Van Volkenburgh |
| 2005/0041580 A1 | 2/2005 | Petrovykh |
| 2006/0020538 A1 | 1/2006 | Ram et al. |
| 2006/0274724 A1 | 12/2006 | Landschaft et al. |
| 2006/0288417 A1 | 12/2006 | Bookbinder et al. |

OTHER PUBLICATIONS

"Digital Envoy Acquires Transaction Monitoring Technology Company Cydelity," [online]. Mar. 5, 2007, Digital Resolve Press Release. [retrieved on Jun. 6, 2007]. Retrieved from the Internet: <URL: http://www.digital-resolve.net/mediaroom/releases/2007_releases/re_030507.html>, 2 pgs.

"IOS Reblet Applications," [online]. © 2005 REBOL Technologies. [retrieved on Jun. 6, 2007]. Retrieved from the Internet: <URL: http://www.rebol.com/ reblets.html>, 10 pgs.

"Monitoring Online Presence," [online]. [retrieved on Jun. 6, 2007]. Retrieved from the Internet: <URL: http://sharkysoft.com/archive/20000000-odsims/ client_client/presence.htm>, 2 pgs.

"The Online Presence Spiral (Unbound Spiral)," [online]. [retrieved on Jun. 6, 2007]. Retrieved from the Internet: <URL: http://www.henshall.com/blog/ archives/000876.html>, 6 pgs.

"Userplane / Destop: Overview," [online]. © Userplane, 2007. [retrieved on Jun. 6, 2007]. Retrieved from the Internet: <URL: http://www.userplane.com/ desktop/>, 2 pgs.

Messerschmitt, D. G., "The Future of Computer-Telecommunications Integration," IEEE Communications Magazine, 34(4), (Apr. 1996), pp. 1-8.

United States Notice of Allowance issued in U.S. Appl. No. 11/759,139 dated Dec. 19, 2014.

United States Final Office Action issued in U.S. Appl. No. 11/759,139 dated Mar. 6, 2014.

United States Non-Final Office Action issued in U.S. Appl. No. 11/759,139 dated Nov. 7, 2013.

United States Final Office Action issued in U.S. Appl. No. 11/759,139 dated May 25, 2012.

United States Final Office Action issued in U.S. Appl. No. 11/759,139 dated Jun. 24, 2011.

United States Non-Final Office Action issued in U.S. Appl. No. 11/759,139 dated Jun. 6, 2007.

United States Non-Final Office Action issued in U.S. Appl. No. 11/759,135 dated May 12, 2010.

United States Final Office Action issued in U.S. Appl. No. 11/759,129 dated Dec. 21, 2009.

United States Non-Final Office Action issued in U.S. Appl. No. 11/759,129 dated Jun. 1, 2009.

United States Non-Final Office Action issued in U.S. Appl. No. 11/759,121 dated Dec. 3, 2009.

United States Non-Final Office Action issued in U.S. Appl. No. 11/759,115 dated Dec. 3, 2009.

United States Non-Final Office Action issued in U.S. Appl. No. 11/759,115 dated May 28, 2009.

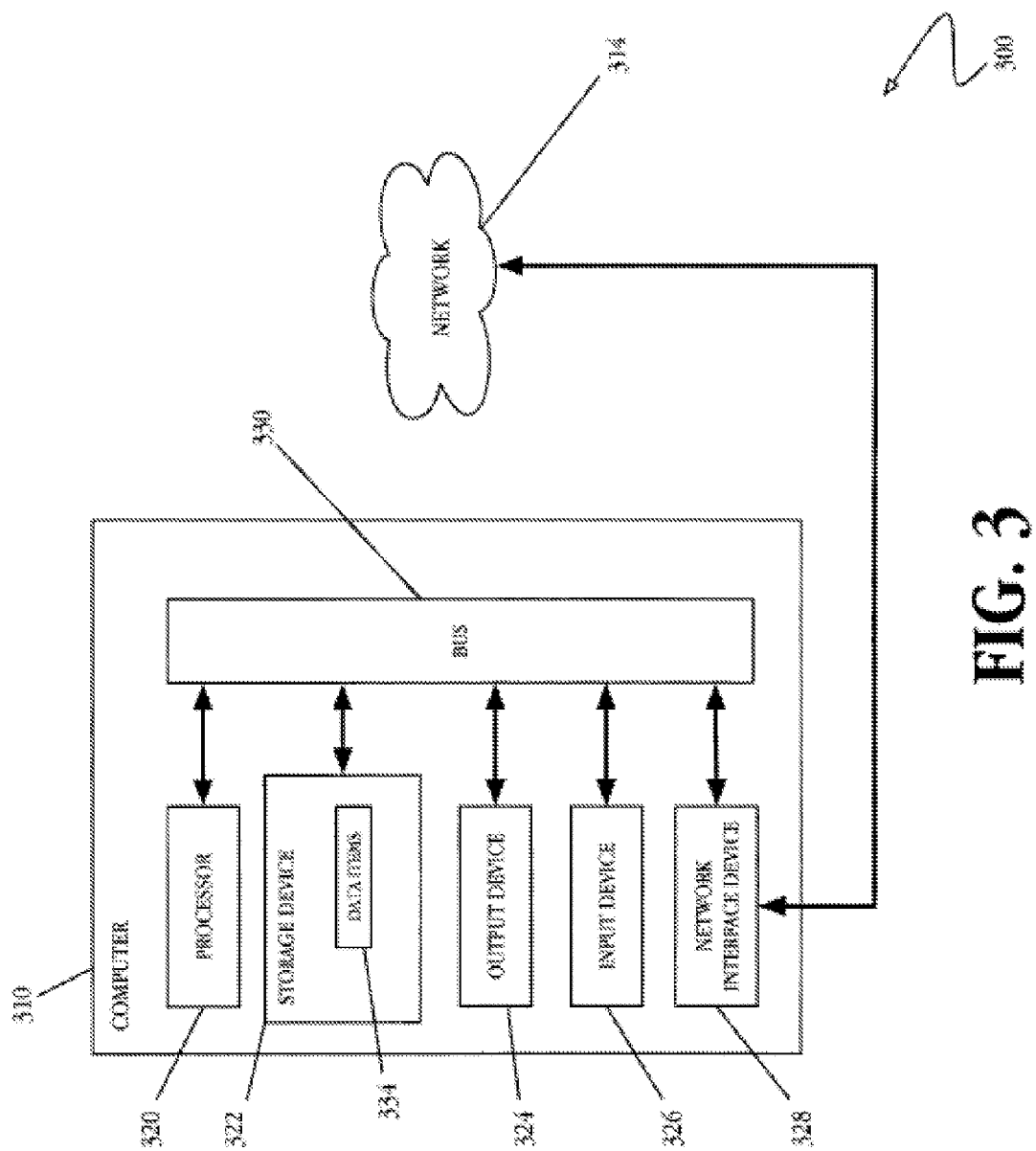

SYSTEMS AND METHODS FOR STATE INFORMATION EXCHANGE

CROSS-REFERENCE TO RELATED APPLICATIONS

This application is continuation of U.S. patent application Ser. No. 14/690,718, issuing as U.S. Pat. No. 9,344,572, entitled "Systems and Methods for State Information Exchange," filed Apr. 20, 2015, which is a continuation of U.S. patent application Ser. No. 11/759,139, issued as U.S. Pat. No. 9,014,365, entitled "Systems and Methods for State Information Exchange," filed Jun. 6, 2007, each of which is incorporated by reference herein in its entirety.

This disclosure is related to U.S. patent application Ser. No. 11/759,135, entitled "Systems and Methods for State Information Exchange," U.S. patent application Ser. No. 11/759,129, entitled "Systems and Methods for State Information Exchange," U.S. patent application Ser. No. 11/759,121, entitled "Systems and Methods for State Information Exchange," and U.S. patent application Ser. No. 11/759,115, entitled "Systems and Methods for State Information Exchange," each of which was filed on Jun. 6, 2007, and each of which is incorporated by reference herein in its entirety.

TECHNICAL FIELD

Embodiments disclosed herein relate, generally, to systems and methods that provide information content to consumers, including systems and methods for concurrently exchanging information content, and more particularly, to systems and methods for state information exchange.

BACKGROUND

Consumer demand for products and services in the banking and insurance industries continues to grow world-wide. Increasingly larger call centers are used to address this demand. Consumers requiring access to insurance and banking information, or those wishing to change policy or account values, for example, may be routed through a call-center. Often it is necessary to place the consumer on hold while locating an available agent. The agent may place the caller on further hold at some point during the conversation to gather additional documentation. Call holding typically provides a less than satisfying experience for the consumer. One solution is to place more agents in the call center to reduce wait times. As a company expands its available products and services to meet growing demand, allocating ever more agents can be costly.

SUMMARY

Currently, consumers browsing the webpages of a company's website rely on the links provided therein to obtain information, which consumers may find difficult to use for locating the desired information, even if the page is well formatted. The consumer often selects a link leading to another webpage containing information the consumer is not seeking. This hunt-and-peck method of searching can be unproductive and frustrating. Consumers can also become frustrated completing online forms if the consumer does not fully understand the questions, or if a question appears redundant or vague. The addition of a help file link may not be very useful if it is lengthy, even with keyword searching, or does not anticipate the consumer's questions or does not provide a scenario to the question. In the banking and insurance industries, for example, on-line forms can be particularly frustrating to the consumer since many questions pertain to valuations, expectancies, and derivatives. Because responses to question can also have significant financial and legal repercussions, consumers may be reluctant to just guess. Interaction with government agencies on-line can be equally frustrating. For example, a consumer using an on-line form to file a do-not-call complaint with the Federal Communications Commission is required to provide detailed phone and identification information about the alleged violation. It may be difficult for the consumer to know which phone number should be entered and where, since call identification questions may appear ambiguous, vague and redundant. Consequently, an inaccurate or incomplete complaint may be filed, or the consumer may give up and not file at all. In view of the above, the inventors have realized the need for human intervention and assistance at the point where the consumer is having a problem completing the on-line form. The need for increasingly complex systems capable of delivering highly integrated services is also recognized.

The integration of a web-enabled system and a phone-based system can be used to apprise a company representative of the browsing state of someone accessing a company's webpages. Such integration can also enable a high level of interaction between consumers and company representatives, likely leading to a high level of consumer satisfaction. The above integration, for example, permits a member of an organization to dial into a member service representative that is able to view the point on a webpage form where the member is stalled and provide assistance. Documents can also be electronically pushed out to the consumer while the consumer is speaking with a company representative or is placed on hold. While on hold, customized marketing messages can be played to the consumer through the phone system. Customized marketing messages can also be directed to the consumer for display on the consumer's computer. Further, information can be provided to the consumer by a company representative in near real time concerning the documents electronically provided. This can eliminate much guesswork on the part of the company representative and provides a high level of directed service to the consumer, which is a quantum leap in service. For example, an on-line auto policy quote can be delivered electronically for an electronic signature, rather than provided by mail or facsimile to be signed and returned by mail or facsimile. A process that has traditionally taken days, can be performed in minutes. Accordingly, the entire transaction process can be attended to through completion, including the most critical phase.

It is expected that this will increase consumer satisfaction and customer retention. In an embodiment, a method of associating state information for disparate systems includes receiving information from a user through a first communications system. The method also includes querying a second communications system for the presence of the user on the second communications system. The second communication system is configured for receiving packetized information. The method also includes alerting an agent to the presence of the user on the second communication system, while interacting with the user through the first communications system.

In another embodiment, a method of delivering messages through disparate systems includes transmitting first information through a first communications system to a user in response to a first query. The first information is assembled in a packet format for transmission and includes the first data provided by the user. The method also includes transmitting additional information to the user through a second communications system, the transmitting being initiated by the first query. The additional information is generated by deducing from second data provided by the user through either the first or the second communications system. The first and the second information are subsequently transmitted to the user during a concurrent session.

In another embodiment, a message delivery system includes a first communications system interface coupled to a call center and configured to operate in asynchronous mode. The system also includes a presence detection module coupled to the first communications system interface. The presence detection module is configured to detect an on-line presence of the user and a current webpage accessed by a browser operated by the user and to provide a pointer to the current webpage. The system also includes a second communications system interface coupled to the presence detection module. The second communication system interface is configured to provide other information to the user concurrent with information provided through the first communications system interface.

In another embodiment, a machine readable medium having machine-executable instructions is used, either in whole or in part, in the performance of the methods described herein.

In another embodiment, a method of associating data includes recording first information provided to a user through a public packet-switched network. The method also includes receiving second information from the user at a call center through a public telephone system. The second information including an acoustic signal generated by the user. The method also includes querying a server through a private network for presence of the user on the public packet-switched network and associating the user with the first information. The method also includes directing the first information to an agent in contact with the user through the public telephone system.

In another embodiment, a system includes a call center containing a plurality of selectable agents. The system also includes a web-enabled server coupled to the call center by a private network. The server is coupled to a presence detection module and an advertisement engine. The presence detection module is configured to determine an on-line status of a user. The advertisement engine is configured to a provide message based on a user characteristic. The server is configured to provide a copy of an on-line document accessed by a user and to notify at least one of the plurality of selectable agents to the on-line status of the user.

BRIEF DESCRIPTION OF DRAWINGS

Embodiments are illustrated by way of example and not limitation in the figures of the accompanying drawings, in which like references indicate similar elements.

FIG. 3 is a block diagram illustrating a machine including instructions to perform any one or more of the methodologies described herein.

DETAILED DESCRIPTION

Titles are provided in the following detailed description for convenience and are not intended to limit the scope of the subject matter described anywhere herein. The first section presents an overview of embodiments of the inventive subject matter with reference to a system for exchanging information. The second section presents example systems according to various embodiments. The third section provides example methods of using embodiments of the inventive subject matter. The fourth section describes an example implementations of the inventive subject matter.

As used herein, "intranet" refers, generally, to a private network providing communications among servers, data storage units and machines coupled to the private network. "Machine" refers, generally, to any device or system capable of using a machine-readable medium, such as a read-only memory (ROM), a random access memory (RAM), a magnetic disk storage media, an optical storage media, a flash memory device, media including a barcode, media including ink, a punch card, paper tape, and the like. Example machines include, without limitation, a computer, a personal digital assistant, and a cell phone. The term "user" refers, generally, to a "human entity", but can also refer to a proxy device operating under human identity, such as a proxy server. "Module" refers, generally, to a software, hardware and firmware components, as is known to one of ordinary skill in the art, and includes executable code and instructions and/or circuitry as necessary to perform a stated function. The terms "coupled" and "coupling" refer, generally, to the linking of electromagnetic signals in any form, and includes direct and indirect linking. The term "agent" includes any representative authorized by the company to perform a service on behalf of the company.

Figure 1:
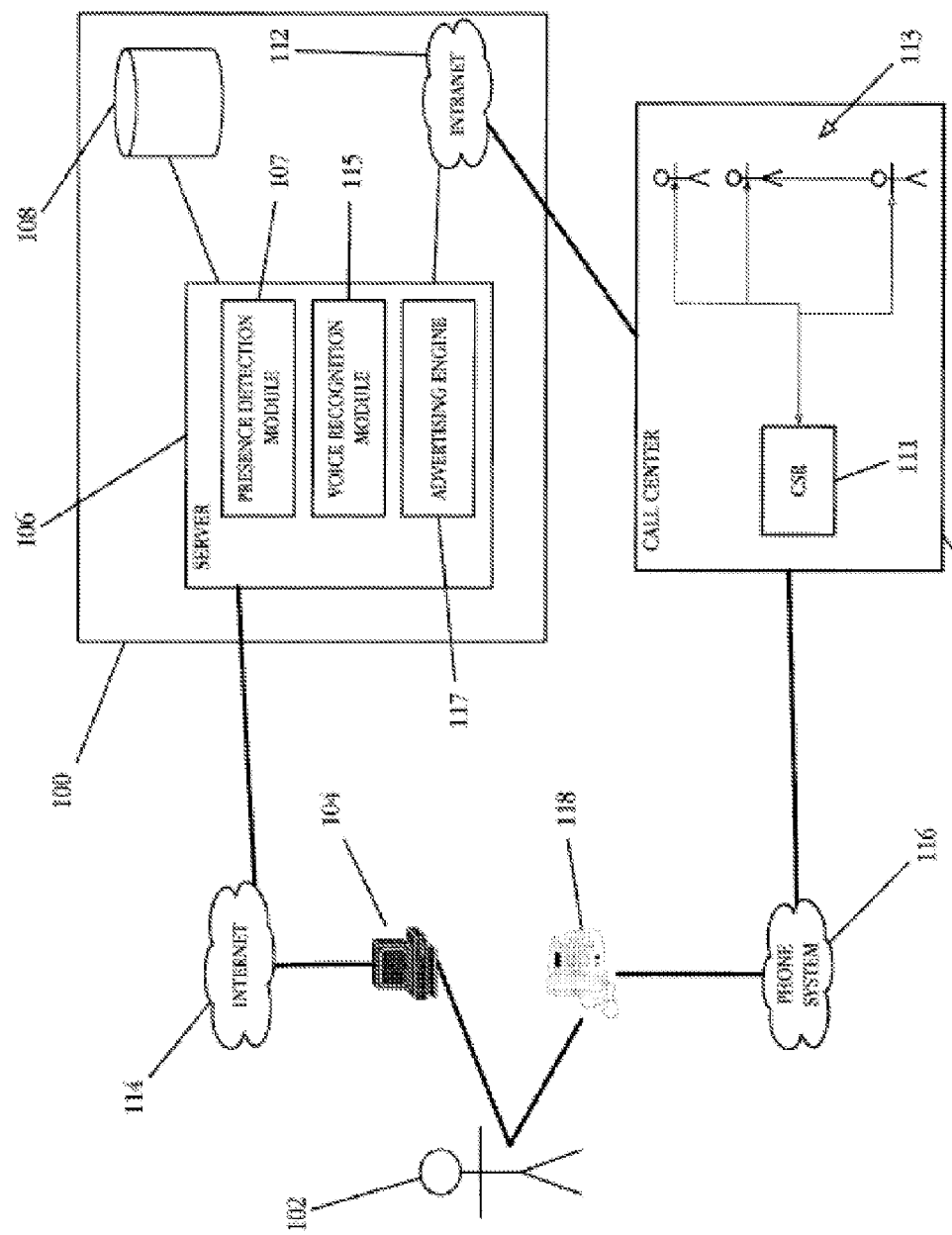
FIG. 1 is a diagram illustrating a system for exchanging information, in accordance with an example embodiment.

FIG. 1 is a diagram illustrating a system for exchanging information, in accordance with an example embodiment. In this example, a computer 104 associated with user 102 is configured for coupling to a server 106 owned or operated by company 100 through a publicly accessible communications infrastructure capable of routing data packets, such as the Internet 114. Computer 104 can include a display. Server 106 can be coupled to data store 108 that contains information accessible to the server. Server 106 is configured to provide information content to authorized users, such as an on-line form to be completed by a user. In some embodiments, data store 108 is located within server 108. In some embodiments, the data store is coupled to server 106 through an intranet, such as Intranet 112. Server 106 may be coupled to one or more other servers as necessary to provide a desired content, to accommodate a specified number of users, and to reduce queue times.

Computer 104 can communicatively interact with server 106 using a web browser, such as Internet Explorer™, Netscape™, Mozilla™, Opera™, Firefox™, and Camino™ as examples. A small text file, such as a hypertext transfer protocol (HTTP) cookie can be inserted by server 106 into a browser memory of a web browser operating on computer 104. HTTP cookies can be used by server 106 for authenticating, tracking, and maintaining specific information about a user web session. Persistent and session HTTP cookies can be used. In some embodiments, a duplicate of the HTTP cookies placed in the memory of the web browser operating on computer 104 are stored in data store 108 for further use.

The example of FIG. 1 also illustrates a phone system 116 coupling user 102 with an agent 113 through a call center 110. Phone system 116 can be configured to process signals related to synchronous and/or asynchronous communications. User 102 can access phone system 116 with a device 118, such as a telephone, a cell phone, and a device capable of generating acoustic signals, such as a teletypewriter (TTY) or a telecommunications device for the deaf (TTD). A call center typically operates a phone bank for an entity, such as company 100. In some embodiments, company 100 owns or operates call center 110. Call center 110 can serve as a point of access for a user 102 for contacting a human customer service representative 111 (CSR) by phone. Customer service representative 111 can be an automated system responsive to audio tones input by user 102 via device 118 using a keypad. Customer service representative 111 can also include a voice recognition module configured to be responsive to user 102, as described below. In some embodiments, the call center is configured to allow a CSR 111 access to a voice recognition module, such as module 115. In some embodiments, an automated response system is used for accessing a human CSR. In some embodiments, call center 110 is coupled to a call center computer (not shown) configured to receive calls through Internet 112.

As illustrated, call center 110 is configured to access server 106 using Intranet 112. Incoming voice, TTY and TDD traffic to call center 110 received by CSR 111 can be routed to an agent 113. The CSR 111 can select any available agent 113, or can select one of the agents 113 according to one or more specified criteria. For example, call center 110 may include a plurality of agents 113 specializing in one or more of home, auto, life, personal property, and business insurance, as well as financing, trust fund accounts, stock brokerage, arbitrage accounts, and mutual and hedge funds. Here, the agent 113 selected by CSR 111 is based on the type of service the user 102 is seeking. Contact with the agent 113 may be for assistance in a answering a general question and in filling out an on-line form to complete a transaction. Server 106 includes a presence detection module 107, a voice recognition module 115, and an advertisement engine 117. Presence detection module 107 is configured to sense a current webpage viewed by user 102. In some embodiments, presence detection module 107 is configured to sense a web session and determine whether user 102 is currently on-line and connected to server 106. In some embodiments, detection module 107 is configured to alert an agent 113 to the on-line presence of the user. In some embodiments, presence detection module 107 is configured to determine the on-line status of user 102 automatically upon the user's contact with the call center. Detection module 107 can also be configured to provide a pointer a memory location where the current webpage being viewed by user 102 is stored. In some embodiments, module 107 is configured to receive data associated with a script, such as a JavaScript™, running on computer 104. Here, an autoreload script can be passed from server 106 to computer 104 to cause a page displayed in a web browser window to be automatically updated (or refreshed) and transmitted back to server 106. In some embodiments, the autoreload script is passed to computer 104 attached to an on-line form to be completed by user 102.

Voice recognition module 115 can be configured to identify a previous caller and to provide an corresponding identifier for associating the user with a phone system activity and/or web-based system activity. For example, the voice recognition module 115 can include a speech synthesizer configured to match a user identifier with a voice characteristic. Examples of a user identifier includes a user name, a user internet protocol address, a domain name address, a telephone number, an account number, a policy number, an invoice, a policy number, and the like. The voice recognition module 115 can also include a voice stress analyzer to sense the amount of stress, frustration or anger in an audio signal associated with user 102. The voice recognition module 115 can be coupled to call center 110 such that an incoming call is automatically routed through the module 115 while user 102 is in voice contact with CSR 111. Where user 102 distress is sensed in a voice characteristics, the call can be automatically directed to a representative especially skilled in customer relations, or CSR 111 can be alerted to the caller's distress so that the CSR can respond appropriately. The speech synthesizer can also used to identify whether user 102 is presenting a prior-asked question. Here, CSR 111 can respond to user 102 by noting the continued problem and assuring the user the question will be carefully addressed. In some embodiments, presence detection module 107 is used in combination with voice recognition module 115 to identify a webpage of a current session for user 102.

Advertising engine 117 can be configured to generate advertisements, marketing messages and offers in textual, audio and video formats. The advertisements, marketing messages and offers can be pre-generated and stored in a library for selection or generated during the time the user is connected to server 106 or in contact with call center 110. Advertising engine 117 can be used to select specified advertisements to be presented to user 102 without input from an agent 113. The advertisements can be personal to the user. Here, one or more advertisements are selected based on one or more financial, legal, or familial aspect, characteristic or status of user 102. The financial, legal, or familial aspect, characteristic or status of user 102 can be based on a prior interaction recorded in a memory, or a current session using information provided during the call into call center 110. In some embodiments, the advertisements, which also include directed marketing messages, are inferred or deduced from a prior recorded transaction or a prior interaction. In some embodiments, the advertisements are inferred or deduced from present interaction, such as a present call into call center 110. In some embodiments, advertising engine 117 selects one or more advertisements to be played based on a value to user 102. In some embodiments, advertising engine 117 selects one or more advertisements to be played to user 102 based on an algorithm configured to predict a likely maximum return or a maximum profit to company 100, in the event the product or service is selected. In some embodiments, advertising engine 117 selects one or more advertisements based on an algorithm configured to predict a product or service most likely to be chosen by user 102. In some embodiments, one or more advertisements are selected by an agent 113 while users is connected to call center 110. Here, the agent's selection can be based on an observation, or a prior personal contact with user 102, or a prior recoded transaction or interaction involving user 102. The agent's section can also be inferred or deduced from the current interaction, or from one or more prior transactions or interactions with user 102. In an embodiment, the message selected is based on knowledge derived from another user. For example, knowledge derived or provided from a relationship between user 102 and a spouse or other family member.

Server 106 can be configured to allow user 102 to select an advertisement for replay, to request more information about the advertisement being presented, or to alert an agent 113 or CSR 111 of a desire to accept or pursue an offer currently presented. Here, for example, user 102 can push a number on a phone keypad corresponding to a specified action stated in the message, such as "select #1 for more information, #2 to repeat the message, #3 to complete the offer", and the like. In some embodiments, the agent 113 or CSR 111 is alerted that no action was taken by user. Here, the lack of action can be later analyzed to improve upon or change message content.

In some embodiments, agent 113 can access the HTTP cookies in data store 108 to assist in further transacting with user 102. For example, user 102 viewing webpage content on server 106 can initiate contact with call center 110 via phone system 116. User 102 can provide identification, such a phone number, a member number, a credit card number, a policy number, an association number, an account number and the like. In some embodiments, the identifier associated with the user is a phone number obtained by automated caller ID. An agent 113 may communicate with server 106, and using the identification associated with user 102 and the one or more HTTP cookies in data store 108, access a webpage currently viewed by user 102 on computer 104.

The above is meant to be illustrate of a possible arrangement and is not intended to limited the inventive subject matter to a particular configuration. For example, one or more of presence detection module 107, voice recognition module 115, and advertisement engine 117 can be located external to server 106 an coupled to it through Intranet 112.

Figure 2:
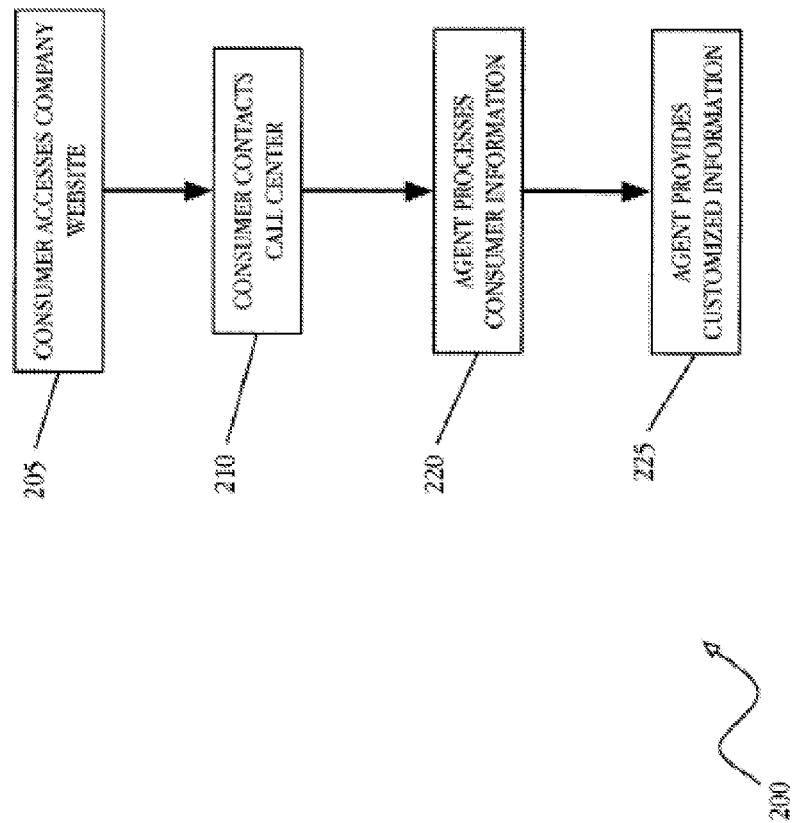
FIG. 2 is flowcharts illustrating a method of exchanging information, in accordance with an example embodiment.

FIG. 2 is a block diagram illustrating a method for exchanging information, in accordance with an example embodiment. In this example, the method begins at block 205 with the user accessing an organization's website through a server. As the user views the webpage of interest, a persistent HTTP cookie is set in the memory of the user's web browser. In some embodiments, a session cookie is set in the memory of the user's web browser. In some embodiments, a copy of the persistent and/or session cookie is stored in a data store coupled to the server providing access to the organization's webpages. The persistent cookie can contain tracking information related to the webpages visited or viewed by the user during the present or a prior web session. In some embodiments, a module configured for sensing the presence of a user is used to track a current webpage viewed by the user. In some embodiments, the user is required to provide an identifier to access one or more webpages. Examples of an identifier include, without limitation, a name, a phone number, a membership number, a policy number, an invoice number, credit card number, a debit card number, a social security number, a military identification number, and an account number. In some embodiments, the identifier is authenticated by the server before providing access to a further webpage. In some embodiments, the user is permitted to enter information into an on-line form, or an on-line questionnaire based on the identifier provided. In some embodiments, the information entered is intermittently transmitted to a company server using a script configured to auto-update entered information at the server.

The server can be configured to provide customized advertisements, directed marketing messages and offers to the user without human intervention based on the identifier and/or the contents of a persistent cookie or a session cookie. The server can be configured to interpret the intentions of the user to provide the user with information directed at products and services likely to be of interest. User intentions can be inferred or deduced from prior information provided by the user. The identifier can be used for associating the user with membership in a particular group having a specified need. For example, the server may recognize the identifier as belonging to a member homeowner lacking flood insurance. The server can push out a message opening a browser window on the user's computer and play an audio file or a video file estimating relative costs of flood insurance versus flood damage replacement costs and projecting a likelihood of a flood event where the member's home resides. The playing of the message can be timed to coincide with an idle period of activity, and the browser window can be made sufficiently small so as to not significantly obstruct the user's activities. In some embodiments, the message is configured to by played on the user's computer after the session has ended using a script.

At block 210, the user contacts a call center of an organization for further assistance with an on-line form or for other information. In some embodiments, the user contacts the call center for resolution of a stalled web session. The call center directs the user to the appropriate agent or representative. In some embodiments, the call center is able to identify the user by the caller's phone number. In some embodiments, the user enters an identifier using a device, such as a phone, a TDD, and a TDY. In some embodiments, the user identifier is entered by the user's voice. In some embodiments, the user identifier is entered using a keypad. In some embodiments, the user is identified by voice comparison with a prior recorded audio file containing voice characteristics associated with the user. During the time period the call is being routed to an agent for assistance, an audio message can be played over the phone. The message selected for playing can be associated with the caller's question or the identifier provided by the caller. The audio message can be related to information stored about the user in a database accessible to the call center. Examples of messages includes, without limitation, an general advertisement, a directed advertisement, a directed marketing message, and an offer. In some embodiments, the message selected is inferred from information provided by the user during the current phone conversation or a prior recorded contact with the user. In some embodiments, the message selected is deuced using information provided by the user during the current phone conversation or a prior recorded contact with the user. A prior recorded contact can include information entered during a prior web session or a prior phone contact. During the time the message is played, the user can be provided the option of selecting a further action. For example, the user can select "message replay", "new message", "more information", and "complete the offer". User selection can be by voice or by a device, such as a keypad configured to generate audio tones for transmission through a phone system.

At block 220, the agent contacted proceeds to assist the caller in completing the on-line form or in proving the information requested by the user. In some embodiments, the agent accesses a presence detection module to identify whether the user is currently connected to a company server. If the user is still on-line with the server, the presence detection module can be used to provide a pointer to the current webpage being viewed by the user. In some embodiments, the presence detector module is used to assist in identifying the user. The agent is also able to access persistent and session cookies associated with the webpages viewed by the user during the current or a prior session. Using the information provided by the present detector module in combination with one or more cookies, the agent is able to retrieve session information for the user and can view the state of the on-line form on a desktop display while the user remains on-line. In some embodiments, a script running on the user's computer accessing the company server continuously updates the on-line form at the server end. Accordingly, the agent can determine what information was entered and at which point on the form the user has not entered information in near real time. The agent is therefore is provided a snapshot of the view of the user as imaged on the display of the user's computer. The agent can complete the form directly using input from the user over the phone or can communicate directions over the phone for on-line entry by the user. In some embodiments, the user can view information on-line as it is being entered by the agent using a script that auto-refreshes the form on the user's display. Here, updated information is being pushed out to the user from the agent. Because the user is able to view the information in near real time, the user can quickly correct any errors. In some embodiments, streaming content is pushed out to the user's computer accessing the company's web server. In some embodiments, the user's and the agent's web browser page is updated automatically and intermittently for a specified time period until the session has ended.

At a point during the call the agent places the user on-hold to obtain information from another source, the agent can select an audio message to be played to the user while on-hold. The audio message can be based on some financial, legal or familial characteristic or status of the user. For example, during the conversation the agent notes that the user has recently had a baby. Here, the agent selects on the "new baby" life event message related to financial products and services applicable to someone with a new baby. In some embodiments, a video or audio file can be pushed out to the on-line user directed at some aspect relevant to the user through the server, such as the "new baby" life event message. Here, a window is opened in the browser and the message is played while the user is on hold.

The audio message sent to the user over the phone can include options for selecting a product or service. Using the "new baby" example, the message can also request the user press a phone key, such as "press #1 or more information, #2 for an immediate quote, #3 for more information." The user's desire can also be accommodated by user voice during the time the message is playing. In either case, the agent can be notified of the selection made by the user and the offer, quote or additional information is pulled from a server to the agent's desktop for display. In addition, the same message can be pushed concurrently to the user and played in a browser window. Here, the user can be asked to press a key on the computer keyboard corresponding to a request.

At block 225, the agent provides customized information to the user online. This can be a formalized document, such as contract or a policy in the form of a text document or a PDF file finalizing an on-line transaction. Such customized information can also be in electronic form allowing the user to print out an on-screen copy for reviewing and archiving. In some embodiments, the user is able to electronically sign the electronic form transmitted by the agent configured to have a legal effect at the point the electronic signature is recorded on a company server. An audio message can also be delivered by phone concurrent with the on-line delivery of the customized information. The audio message can be related to the on-line form, such as further instruction, or can be a different message, such as an advertisement or offer.

FIG. 3 is a block diagram illustrating machine including instructions to perform any one or more of the methods described herein. System 300 includes a computer 310 connected to a network 314. In some embodiments, computer 310 is a machine such as computer 104, as described above and illustrated in FIG. 1. In some embodiments, computer 310 is a machine such as server 106, as described above and illustrated in FIG. 1. The computer 310 includes a processor 320, a storage device 322, an output device 324, an input device 326, and a network interface device 328, all connected via a bus 330. In some embodiments, storage device 322 is a data store such a data store 108, as illustrated in FIG. 1. In some embodiments, storage device 322 includes a data store, such a data store 108. Processor 320 represents a central processing unit of any type of architecture, such as a CISC (Complex Instruction Set Computing) processor, RISC (Reduced Instruction Set Computing) processor, VLIW (Very Long Instruction Word) processor, or a hybrid architecture, although any appropriate processor may be used. Processor 320 executes instructions and includes that portion of the computer 310 that controls the operation of the entire computer. Although not depicted in FIG. 3, processor 320 typically includes a control unit that organizes data and program storage in memory and transfers data and other information between the various parts of computer 310. Processor 320 receives input data from input device 326 and network 314 reads and stores code and data in storage device 322 and presents data to output device 324.

Although computer 310 is shown to contain only a single processor 320 and a single bus 330, the disclosed embodiment applies equally to computers that have multiple processors and to computers that may have multiple busses with some or all performing different functions in different ways.

Storage device 322 represents one or more mechanisms for storing data. For example, storage device 322 may include read-only memory (ROM), random access memory (RAM), magnetic disk storage media, optical storage media, flash memory devices, and/or other machine-readable media. In other embodiments, any appropriate type of storage device may be used. Although only one storage device 322 is shown, multiple storage devices and multiple types of storage devices may be present. Further, although computer 310 is drawn to contain storage device 322, it may be distributed across other computers, for example on a server.

Storage device 322 includes a controller (not shown in FIG. 3) and data items 334. The controller includes instructions capable of being executed on processor 320 to carry out the functions, as previously described above with reference to FIG. 1 and FIG. 2. In another embodiment, some or all of the functions are carried out via hardware in lieu of a processor-based system. In one embodiment, the controller is a web browser. In other embodiments, the controller may be a database system, a file system, an electronic mail system, a media manager, an image manager, or may include any other functions capable of accessing data items. Storage device 322 may also contain additional software and data (not shown), which is not necessary to understand the invention.

Although the controller and data items 334 are shown to be within storage device 322 in computer 310, some or all of data items 334 may be distributed across other systems, for example on a server and accessed via network 314.

Output device 324 is that part of the computer 310 that displays output to the user. Output device 324 may be a liquid crystal display (LCD) well-known in the art of computer hardware. In other embodiments output device 324 is replaced with a gas or plasma-based flat-panel display or a traditional cathode-ray tube (CRT) display. In still other embodiments, any appropriate display device is used. Although only one output device 324 is shown, in other embodiments any number of output devices of different types, or of the same type, may be present. In an embodiment, output device 324 displays a user interface.

Input device 326 may be a keyboard, mouse or other pointing device, trackball, touchpad, touch screen, keypad, microphone, voice recognition device, or any other appropriate mechanism for the user to input data to computer 310 and manipulate the user interface previously discussed. Although only one input device 326 is shown, in another embodiment any number and type of input devices may be present.

Network interface device 328 provides connectivity from computer 310 to network 314 through any suitable communications protocol. The network interface device 328 sends and receives data items from network 314.

Bus 330 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

Computer 310 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of computer 310. For example, other peripheral devices such as audio adapters or chip programming devices, such as EPROM (Erasable Programmable Read-Only Memory) programming devices may be used in addition to, or in place of, the hardware already depicted.

Network 314 can be any suitable network and may support any appropriate protocol suitable for communication with computer 310. In an embodiment, network 314 supports wireless communications. In another embodiment, network 314 supports hard-wired communications, such as a telephone line or cable. In another embodiment, network 314 supports the Ethernet IEEE (Institute of Electrical and Electronics Engineers) 802.3x specification. In another embodiment, network 314 is the Internet and may support IP (Internet Protocol). In another embodiment, network 314 is a local area network (LAN) or a wide area network (WAN). In another embodiment, network 314 is a hotspot service provider network. In another embodiment, network 314 is an intranet. In another embodiment, network 314 is a GPRS (General Packet Radio Service) network. In another embodiment, network 314 is any appropriate cellular data network or cell-based radio network technology. In another embodiment, network 314 is an IEEE 802.11 wireless network. In still another embodiment, network 314 is any suitable network or combination of networks. Although one network 314 is shown, in other embodiments any number of networks (of the same or different types) may be present.

The embodiments described herein may be implemented in an operating environment comprising software installed on any programmable device, in hardware, or in a combination of software and hardware. Embodiments may be combined, other embodiments may be utilized, or structural, logical and electrical changes may be made without departing from the scope of the present invention.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, each claim stands on its own as a separate preferred embodiment.

It is emphasized that the Abstract is provided to comply with 36 C.F.R. §1.62(b) requiring an Abstract that will allow the reader to quickly ascertain the nature and gist of the technical disclosure. It is submitted with the understanding that it will not be used to interpret or limit the scope or meaning of the claims.

What is claimed is:

1. A computer-implemented method comprising:

initiating, by a computer coupled to a presence detection module and an advertisement engine, a call session for a call from a user to a call center, the call center including a plurality of selectable agents, upon detecting the call from the user;

identifying, by a voice recognition module coupled to the computer, the user based upon a user voice-based interaction;

wherein the user and a client device of the user are associated with the call session;

automatically identifying, by the presence detection module coupled to the computer, an on-line status of the user and one or more webpages currently or previously accessed by a browser application of the client device associated with the user and associated with the call session, upon the call center receiving the call from the user;

selecting, by the advertisement engine coupled to the computer, from an advertisement database storing one or more advertisements, a targeted advertisement based upon the one or more webpages currently or previously accessed by the browser; and presenting, by the computer, a message containing the selected targeted advertisement to the client device of the user during an idle period of the call session, wherein the message containing the targeted advertisement is in a format of at least one of an audio file and an image file;

forwarding, by a customer service representative module coupled to the computer, the call to the at least one of the plurality of selectable agents;

notifying, by the presence detection module coupled to the computer, at least one of the plurality of selectable agents of the on-line status of the user, and providing to the at least one of the plurality of selectable agents a pointer to a webpage currently or previously accessed by the user.

2. The method according to claim 1, wherein identifying the set of one or more targeted advertisements further comprises:

determining, by the computer, for each respective advertisement in the advertisement database a maximum profit value associated with the respective advertisement, wherein selecting the set of one or more target advertisements from the one or more advertisements in the advertisement database is based upon the maximum profit determined for each respective advertisement.

3. The method according to claim 1, further comprising:
detecting, by the presence detection module coupled to the computer, a status of the client device of the user associated with the call session based upon activity of one or more devices associated with the call session, wherein at least type of the status includes the idle period.

4. The method according to claim 3, wherein the presence detection module continuously determines the status of the client device during the call session.

5. The method according to claim 3, wherein presenting the message containing the targeted advertisement further comprises:
detecting, by the computer, the idle period during the call session based upon the activity of the one or more devices associated with the call session.

6. The method according to claim 3, wherein the one or more devices associated with the call session is selected from the group consisting of:
the client device of the user, a client device of a service representative, a telephone of the user, and a telephone of the representative.

7. The method according to claim 1, wherein presenting the targeted advertisement further comprises:
generating, by the computer, the message containing the targeted advertisement.

8. The method according to claim 1, wherein identifying the one or more webpages accessed by the browser of the application:
identifying, by the computer, a webpage accessed during the call session by the browser application of the client device of the user.

9. The method according to claim 1, further comprising providing, by the computer, to a client device of a service representative a pointer to the webpage accessed by the browser application of client device of the user during the call session.

10. The method according to claim 1, wherein, upon initiating the call session, the method further comprises:
identifying, by a voice recognition module coupled to the computer, the user based upon the user voice-based interaction via a telephone of the user,
wherein the user and the client device of the user are associated with the call session upon identifying the user according to the voice-based interaction of the user.

11. The method according to claim 10, further comprising:
identifying, by the voice recognition module coupled to the computer, a mood of the user based upon the voice-based interaction,
wherein the computer further selects the set of one or more targeted advertisements based upon the mood of the user.

12. A computing system comprising:
an advertisement database hosted on one or more servers comprising non-transitory machine-readable memory, the advertisement database configured to store one or more records of one or more advertisements;

a presence detection module executed by one or more servers, the presence detection module configured to initiate a call session for a call from a user to a call center, the call center including a plurality of selectable agents, upon detecting the call from the user; automatically identify an on-line status of the user and one or more webpages currently or previously accessed by a browser application of a client device associated with the user and associated with the call session upon the call center receiving the call from the user; and to detect an idle period of the call session, wherein the user and a client device of the user are associated with the call session; notify at least one of the plurality of selectable agents of the on-line status of the user; and provide to the at least one of the plurality of selectable agents a pointer to a webpage currently or previously accessed by the user;

an advertisement engine executed by one or more servers, the advertisement engine configured to select a set of one or more targeted advertisements from the one or more advertisements stored in the advertisement database based upon the one or more webpages currently or previously accessed by the browser application;

a webserver executed by one or more servers, the webserver configured to present a message containing a targeted advertisement of the set of one or more advertisements to the client device during the idle period of the call session, wherein the message containing the targeted advertisement is in a format of at least one of an audio file and an image file; and a customer service representative module executed by one or more servers, the customer service representative module configured to forward the call to the at least one of the plurality of selectable agents.

13. The system according to claim 12, wherein the advertisement engine is further configured to:
determine a maximum profit value associated with each respective advertisement stored in the advertisement database, and
select the set of one or more targeted advertisements based upon the maximum profit determined for each respective advertisement.

14. The system according to claim 12, wherein the presence detection module is further configured to detect a status of the client device of the user associated with the call session based upon activity of one or more devices associated with the call session, wherein at least type of the status includes the idle period.

15. The system according to claim 14, wherein the presence detection module is configured to detect the idle period during the call session based upon the activity of the one or more devices associated with the call session.

16. The system according to claim 14, wherein the one or more devices associated with the call session is selected from the group consisting of:
the client device of the user, a client device of a service representative, a telephone of the user, and a telephone of the representative.

17. The system according to claim 12, wherein the webserver is further configured to generate the message containing the targeted advertisement.

18. The system according to claim 12, wherein the presence detection module is further configured to identify a webpage accessed during the call session by the browser application of the client device of the user.

19. The system according to claim 18, wherein the presence detection module is further configured to provide to a client device of a service representative a pointer to the webpage accessed by the browser application of client device of the user during the call session.

20. The system according to claim 12, further comprising a voice recognition module executed by one or more servers, the voice recognition module configured to identify the user based upon a voice-based interaction of the user via a telephone of the user, and identify a mood of the user based upon the voice-based interaction of the user,
    wherein the advertisement engine is further configured to select the set of one or more targeted advertisements based upon the mood of the user.

* * * * *